United States Patent

[11] 3,572,875

| [72] | Inventor | Lowell A. Noble |
| --- | --- | --- |
| | | Hillsborough, Calif. |
| [21] | Appl. No. | 46,025 |
| [22] | Filed | July 28, 1960 |
| [45] | Patented | Mar. 30, 1971 |
| [73] | Assignee | Varian Associates |

[54] VACUUM TUBE
3 Claims, 1 Drawing Fig.

[52] U.S. Cl............................................. 316/13,
204/311, 204/312, 250/84.5, 313/61, 316/32
[51] Int. Cl....................................... H01j 9/38,
G21g 3/04
[50] Field of Search........................................ 250/84.5;
313/61, 178, 180; 316/32, 13; 204/311, 312;
350/84.5

[56] References Cited
UNITED STATES PATENTS

| 2,926,271 | 2/1960 | Brinkerhoff et al. | 313/61S |
| 2,972,697 | 2/1961 | Johnson et al. | 204/312X |
| 3,013,958 | 12/1961 | Fearon et al. | 204/312X |
| 2,943,239 | 6/1960 | Goodman | 313/61 |
| 2,957,096 | 10/1960 | Bernander et al. | 313/61 |

OTHER REFERENCES
Nucleonics-Vol. 18, No. 12, Dec. 1960- pp. 69— 76.

*Primary Examiner*—Rodney D. Bennett, Jr.
*Assistant Examiner*—Daniel C. Kaufman
*Attorneys*—Leon F. Herbert and Robert W. Dilts CLAIM: 2. A process for making a pulsed-neutron tube containing an active metal having sorbed therein a gas chosen from the group consisting of deuterium and tritium, said process comprising the steps in sequence of heating said tube to an elevated temperature while maintaining a vacuum therein, introducing said gas into said tube, cooling said active metal, below said elevated temperature while forming an electrical discharge in said gas, and sealing said tube permanently closed.

PATENTED MAR 30 1971 3,572,875
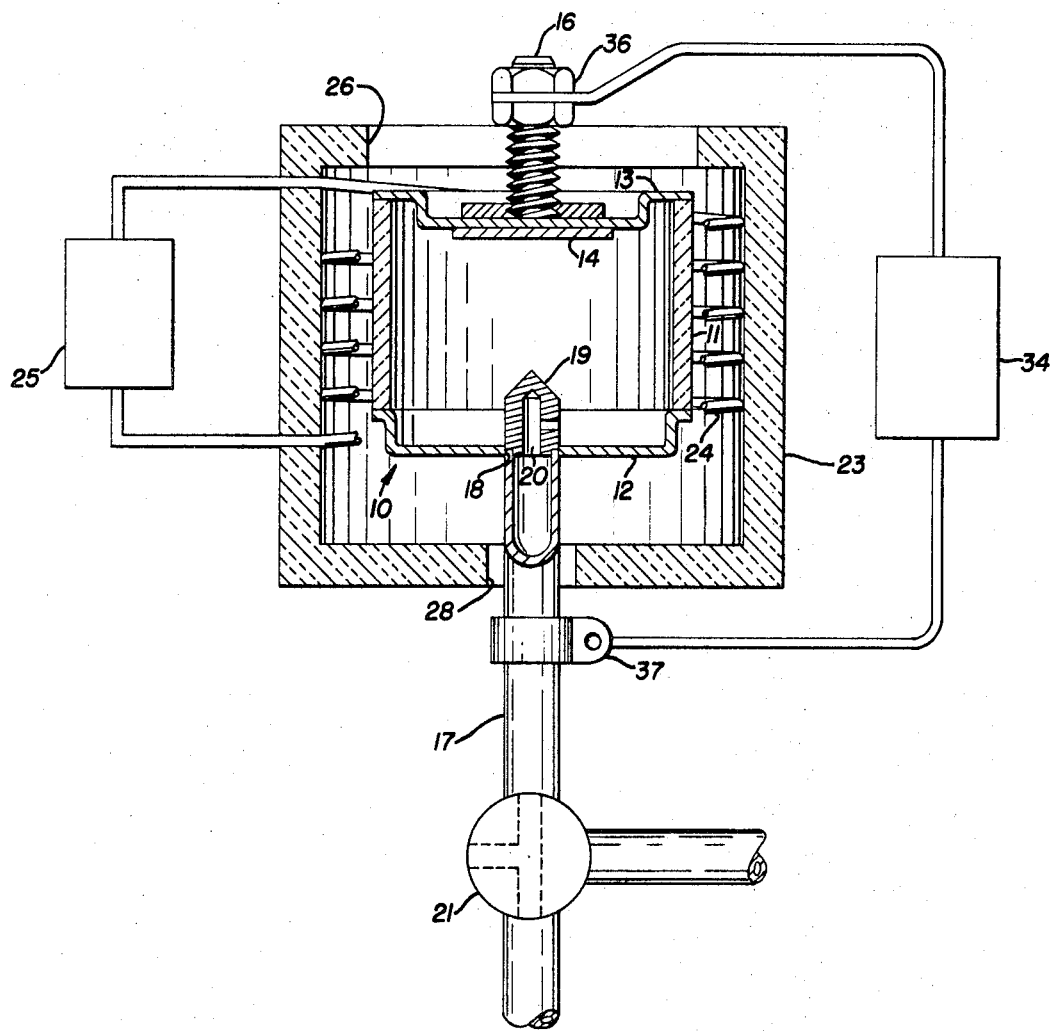
INVENTOR.
LOWELL A. NOBLE
BY
Leon F. Herbert
Robert N. Dilts
ATTORNEYS

VACUUM TUBE

This invention relates to the art of increasing the rate of a chemical reaction, and, particularly, for increasing the chemical reaction rate between a gas and an active metal.

The compound (titanium hydride) formed by titanium and hydrogen sorbed therein is used in many physical and chemical processes. In the past, hydrogen was sorbed (loaded) into the titanium by slowly cooling the metal from 450° C. in a hydrogen atmosphere. This is a time-consuming process and does not result in fully loading the titanium. This situation also exists in varying degree with different gases and when other active metals such as zirconium, lithium, lanthanum, yttrium, thorium, and hafnium are substituted for titanium.

In many applications this situation is undesirable, especially in the case of a pulsed-neutron source type of gas tube in which a titanium film must be loaded with one of the hydrogen isotopes, either deuterium or tritium, and the tube must be filled with the other isotope.

The purpose of a neutron source tube is to produce neutrons, and the quantity of neutrons produced is increased in two ways. One way is to increase the degree of loading of the active metal, and the other way is to make certain that the active metal contains only one of the isotopes of hydrogen while the tube is filled with the other isotope. Then the titanium in neutron source tubes was loaded by the prior art process, the titanium was not fully loaded, and also it was found that since the titanium was not fully loaded with the desired isotope it would, after a period of time, sorb an appreciable amount of the isotope which was present as a gas in the tube.

Accordingly, an object of this invention is to increase the amount of gas sorbed by an active metal.

Another object of this invention is to increase the rate at which an active metal will sorb a gas.

A further object of this invention is to provide an improved gas tube containing hydrogen gas and an active metal loaded with hydrogen, wherein there is a reduced tendency for the hydrogen gas to be sorbed into the active metal.

Broadly described, the invention involves dissociating the gas molecules during the loading process into atoms or ions near the surface of the active metal. The dissociation of the molecules is performed preferably by the use of an arc or glow discharge.

The invention contains other objects and features or advantages, some of which, with the foregoing, will be set forth in the following description of the invention. This invention should be understood to be not limited to the disclosed embodiment, as variant embodiments thereof are contemplated and may be adopted within the scope of the claims.

Referring to the drawing, the single FIG. shows a cross section of a typical gas tube having a gastight envelope containing an active metal and the apparatus for efficiently loading the active metal with gas.

In more detail the drawing shows a vacuum tube 10 having a tubular ceramic insulator 11 with cup-shape electrodes 12 and 13 sealed in gastight relation one on each end of the insulator 11. Electrode 13 has a titanium film 14 on its inside surface and a threaded terminal stud 16 brazed thereto outside the tube 10. At the other end of the insulator, the electrode 12 has a tubulation 17 which communicates with the interior of the tube 10 through a central aperture 18 formed in the electrode 12. A plug 19 on the tubulation 17 protrudes into the tube to shape the electrostatic field within the tube as required to make the tube operate as a pulsed neutron source. The plug 19 has a passageway 20 which connects the interior of the tube 10 with the interior of the tubulation 17.

Before the film 14 is loaded with hydrogen, the interior of the tube 10 must be thoroughly cleaned. This is done by applying a vacuum pump (not shown) to the tubulation 17 through a three-way valve 21 while the tube 10 is baked-out in an oven 23. A resistance coil 24 which receives its electrical energy from a power supply 25 heats the oven 23. The oven is a hollow cylindrical construction having at one end an aperture 26 for inserting the tube 10 therein and at the other end a smaller aperture 28 for passage of tubulation 17.

After the parts 11, 12, 14, 17, and 19 are cleaned by this bakeout process, the tubulation 17 is then transferred through valve 21 from the vacuum pump to a hydrogen supply (not shown). The active metal film 14 is preferably made of titanium and, as is old in the art, the hydrogen is sorbed by the titanium if hydrogen gas is supplied at a predetermined pressure into the tube 10 while the titanium is slowly cooled. However, this invention relates to a new process for sorbing hydrogen in titanium, and accordingly after hydrogen is supplied into the tube and the oven power supply 25 is turned off, a glow or arc discharge is formed within the envelope by a high voltage source 34 connected to the stud 16 by fastening means 26 and to tubulation 17 by fastening means 37. Preferably the discharge should be started before the envelope starts to cool. The discharge can be started at any time during cooling of the envelope, but not as much hydrogen will be sorbed by the titanium by the latter process as by the prior process. The discharge should continue until the envelope is cooled to ambient temperature in order for the titanium to sorb the greatest amount of hydrogen. At any given temperature titanium will sorb more hydrogen during the discharge than when there is not discharge. Also the rate of sorbtion is increased.

The high voltage source 34 may be either DC or AC but if it is a DC source the electrode 13, the electrode with the titanium film, is preferably biased negative with respect to electrode 12. In attempting to explain the invention the gas in ion and atom form, as a result of the discharge, is believed to combine with or to be sorbed by the titanium more readily than in the molecular state. In addition, the reaction between the gas and the titanium is believed to be enhanced even further when the gas ions penetrate the titanium as a result of the ion velocity caused when the titanium is biased negative with respect to the gas ions which are predominantly positive. Accordingly, it should be understood that in applications where gas is sorbed into active metal at a fixed temperature, the reaction is increased by the use of an electrical discharge in the gas.

After the titanium film 14 has been loaded in the described manner, the loading isotope gas is removed from tube 10, the tube is then filled with another hydrogen isotope gas, and tubulation 17 is pinched-off to seal the tube. Although the invention has been described with particular reference to a pulsed-neutron tube, it is of course useful in other situations where an active metal must be fully loaded with a gas.

I claim:

1. A process for sorbing gas into an active metal comprising the steps in sequence of heating said active metal to an elevated temperature in a vacuum chamber, connecting said chamber to a source of vacuum during said heating, exposing said active metal to an atmosphere of said gas, colling said active metal below said elevated temperature, and forming an electrical discharge in said gas during said cooling step.

2. A process for making a pulsed-neutron tube containing an active metal having sorbed therein a gas chosen from the group consisting of deuterium and tritium, said process comprising the steps in sequence of heating said tube to an elevated temperature while maintaining a vacuum therein, introducing said gas into said tube, colling said active metal below said elevated temperature, while forming an electrical discharge in said gas, and sealing said tube permanently closed.

3. A process for making a pulsed-neutron tube containing an active metal having sorbed therein a gas chosen from the group consisting of deuterium and tritium, said process comprising the steps in sequence of heating said tube while maintaining a vacuum therein to clean the interior thereof, introducing one of said gases of said group into said tube, cooling said active metal while forming a glow discharge within said one gas to sorb a portion of said one gas in said active metal, terminating said glow discharge, removing from said tube the nonsorbed remainder of said one gas, and introducing the other gas of said group into said tube.